United States Patent [19]

Kreitz

[11] 3,945,281
[45] Mar. 23, 1976

[54] DUST COLLECTOR FOR RADIAL ARM SAWS

[76] Inventor: Lloyd D. Kreitz, P.O. Box 60, Pequot Lakes, Minn. 56472

[22] Filed: Aug. 5, 1974

[21] Appl. No.: 494,528

[52] U.S. Cl. .................. 83/100; 83/169; 83/471.3; 144/252 R
[51] Int. Cl.² .... B27B 5/20; B27G 3/00; B26D 7/18
[58] Field of Search .......... 83/100, 471.3, 168, 169; 144/252 R

[56] References Cited
UNITED STATES PATENTS

| | | | |
|---|---|---|---|
| 3,322,169 | 5/1967 | Hilliard | 144/252 R |
| 3,401,724 | 9/1968 | Kreitz | 83/471.3 |

Primary Examiner—Donald R. Schran
Attorney, Agent, or Firm—Richard E. Brink

[57] ABSTRACT

Improved form of dust collector for radial arm saws in which a funnel-shaped hood positioned at the rear of the work table is held in place by a clamp mounted so as to overlie the spacer board which is at the rear of the work table. In a preferred embodiment, the clamp has an inverted L-shaped cross-section, a vertical portion of the clamp being gripped between the back of the rear table and the spacer board, and a horizontal portion of the clamp extending over the floor of the hood. Dust and wood particles generated when the saw is used in a ripping position are advantageously and efficiently collected by connecting a vacuum hose to the saw blade guard by a suitable adapter.

8 Claims, 6 Drawing Figures

DUST COLLECTOR FOR RADIAL ARM SAWS

BACKGROUND OF THE INVENTION

This invention relates to radial arm saws, and is particularly concerned with improved dust collection systems for such saws.

My previously issued U.S. Pat. No. 3,401,724 discloses what I believe to be the first really effective dust collecting system for use in connection with radial arm saws. My said patent discloses a flat-bottomed funnel-shaped hood positioned at the rear of the work table on or slightly above the upper surface, the wide inlet end of the hood opening towards the front of the work table and the narrow outlet end of the hood opening oppositely. The hood is horizontally pivotally connected to the radial arm saw assembly so that it can be arcuately rotated to align with the saw blade. At the time I filed the application which matured into my said patent, I believed that it was desirable to mount the funnel-shaped hood on a horizontally disposed sheet metal support having a downwardly turned lip which clamped between the rip fence and the back table of the saw assembly. The hood was mounted on this support and connected to it by a bolt and thumb screw, permitting the hood to be pivoted so as to align with the saw blade.

While the device just described proved extraordinarily effective in commercial practice, my experience over the past several years led me to discover that it also had some negative aspects. For example, I found that the saw blade could come into contact with the support member when the saw was aligned at angles to the left of 0°, thereby posing a safety hazard. In addition, the thumb screw attachment of the hood to the support member allowed the center of the hood floor to bulge upward, particularly at the inlet. Some dust then escaped under the hood into the room, while other dust wedged between the hood floor and the support member, interfering with the positioning of the hood. The thumb screw also tended to stick and bind, making it somewhat difficult and inconvenient to use. Still another disadvantage was the fact that the support member extended over the table clamping device which is located at the rear of the table in some saw assemblies, thereby making table spacing and fence adjustments difficult.

SUMMARY OF THE INVENTION

After a great deal of experimentation with more complicated devices, I have now devised an improved dust collector for radial arm saws which retains the advantages possessed by my earlier dust collector while avoiding the disadvantages. As a result, dust collectors made in accordance with the present invention are outstandingly effective in preventing the escape of dust to the surrounding room and do so in an elegantly simple manner. The entire support member which I previously felt was essential has been eliminated, thereby reducing the size and cost of the unit, increasing effectiveness of dust collection, allowing for easier and more positive installation and insuring that any table clamping device at the rear of the table will remain exposed. Indeed, this improved dust collector and attaching means is universally suited for simple and rapid attachment to every brand of radial arm saw of which I am aware, preferred embodiments of the collector assembly not even requiring the use of any tools for installation.

In the broadest concept of my improved invention, the flat-bottomed funnel-shaped hood of the dust collector is positioned at the extreme rear of the saw table so that the lower surface of the hood floor is in close contact with the upper surface of the spacer board. A clamp, comprising a horizontal member, is held in predetermined position above the upper surface of the spacer board. The lower surface of the hood floor contacts the spacer board, and the lower surface of the horizontal member extends over and snugly engages the upper surface of the hood floor so as to hold the hood floor firmly in a desired position, leaving no gap through which dust can escape. The width of the horizontal member is usually a minor fraction of the width of the floor of the dust collector hood, permitting the hood to be slid laterally pivoted, or both depending upon the angle at which the saw is to be used. The dimensions of the clamp also obviate inadvertent contact with the saw blade. The device has no threads to strip or become wedged with dust, simplifying both use and maintenance.

BRIEF DESCRIPTION OF THE DRAWING

Understanding of the invention will be further aided by referring to the accompanying drawings, in which like numbers refer to like parts in the several views, and in which.

DESCRIPTION OF PRESENTLY PREFERRED EMBODIMENTS

Figure 1:
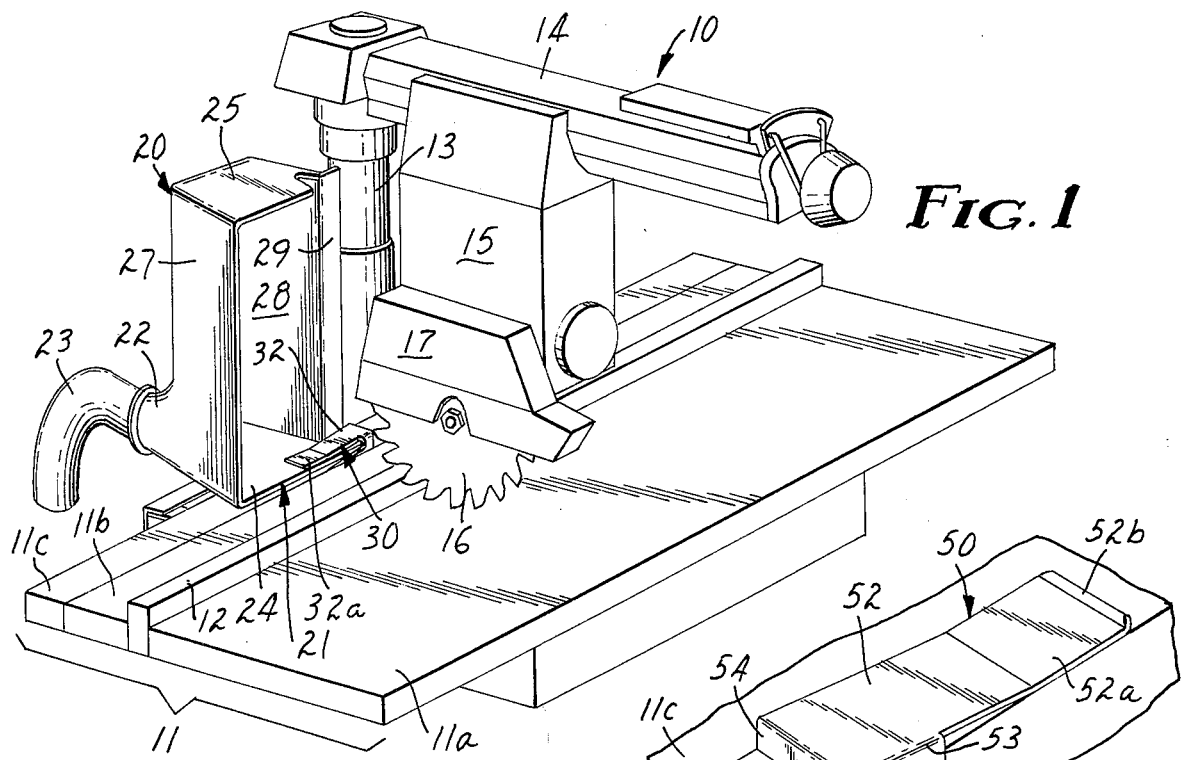
FIG. 1 is a perspective view of a radial arm saw showing the presently preferred embodiment of my improved dust collector in position.

Understanding of the invention will be further facilitated by consideration of the best mode presently contemplated. It is to be understood, of course, that the forms of the device described are illustrative and not limitative.

In the drawings, radial arm saw assembly 10 comprises work table 11, made up of front table 11a and rear table 11b, between which is positioned rip fence 12. Spacer board 11c is located at the back of rear table 11b, and clamps (not shown) draw the subparts of table 11 and rip fence 12 snugly together. Table 11 is supported by a frame (not shown) which also supports vertically extensible column 13, located at the rear of table 11. Extending horizontally from the top of column 13 is radial arm 14, which is capable of rotating through 360°, but which is generally positioned over the top of table 11. Mounted on arm 14, so as to move therealong, is saw carriage 15, including rotary saw blade 16 and guard 17. Typically a discharge elbow extends from some portion of guard 17, permitting sawdust carried by blade 16 to be discharged away from the operator's face during ripping operations (when saw carriage 15 is held in fixed position, with blade 16 parallel to fence 12). The entire assembly 10 as just described, comprises conventional equipment and forms no part of my invention per se.

Positioned at the rear of table 11, and supported by spacer board 11c, is generally funnel-shaped hood 20, having a relatively large inlet opening 21 and a narrow outlet opening 22. Hood 20 comprises floor 24, ceiling 25, rear wall 25, left side 27 and right side 28, the latter side being foreshortened and provided with laterally outwardly extending lip 29. Hose 23 of a conventional shop or other vacuum cleaner (not shown) is connected to outlet 22 to insure the more effective removal of saw dust directed into hood 20.

The lower surface of floor 24 of hood 20 is in snug contact with the upper surface of spacer board 11c, thereby insuring that there will be substantially no gap between the two contacting surfaces through which saw dust might escape. To hold the bottom of floor 24 in contact with spacer board 11c, clamp 30 — which lies at the heart of the present invention — is employed. Clamp 30 comprises vertical member 31 and horizontal member 32, joined along isthmus 33 so as to have a generally L-shaped cross section. At one end of horizontal member 32 is downwardly turned edge 24, the other end portion of horizontal member 32 being bent upward at a slight angle to form hold-down portion 32a, a distal edge portion being still more sharply bent upward to form lip 32b.

In use, clamp 30 is positioned with vertical member 31 located between rear table 11b and spacer board 11c, the right edge of clamp 30 being positioned approximately in front of column 13. Horizontal member 32 extends backward over spacer board 11c, edge 24 lifting the end it adjoins so that hold-down portion 32a is substantially parallel to and snugly in contact with spacer board 11c. Hood 20 is held in a desired location by simply sliding floor 24 between the upper surface of spacer board 11c and the lower surface of hold-down portion 32a, lip 32b and shortened hood wall 28 facilitating this maneuver. Hood 20 can then be moved laterally or rotated to achieve optimum alignment with saw blade 16, the absent portion of vertical member 31 to the left of isthmus 33 increasing the degree of adjustment possible. In normal operating, then, clamp 30 can be once positioned and allowed to remain in the same place.

Clamp 30 is fabricated from material possessing the combined attributes of strength and stiffness, so that it can occupy minimum space. While sheet metal—e.g., 14 gauge cold-rolled or spring steel—is highly satisfactory, it is generally preferred to use fiberglass-reinforced polyester resins, tough ABS polymers, epoxy resins, polyoxymethylene, etc., obviating any possibility of damaging saw blade 16 in the remote possibility of its encountering clamp 30.

Figure 4:
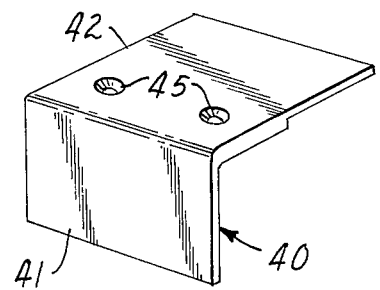
FIG. 4 is a perspective view of another form of clamp suitable for use in connection with my invention.
Figure 6:
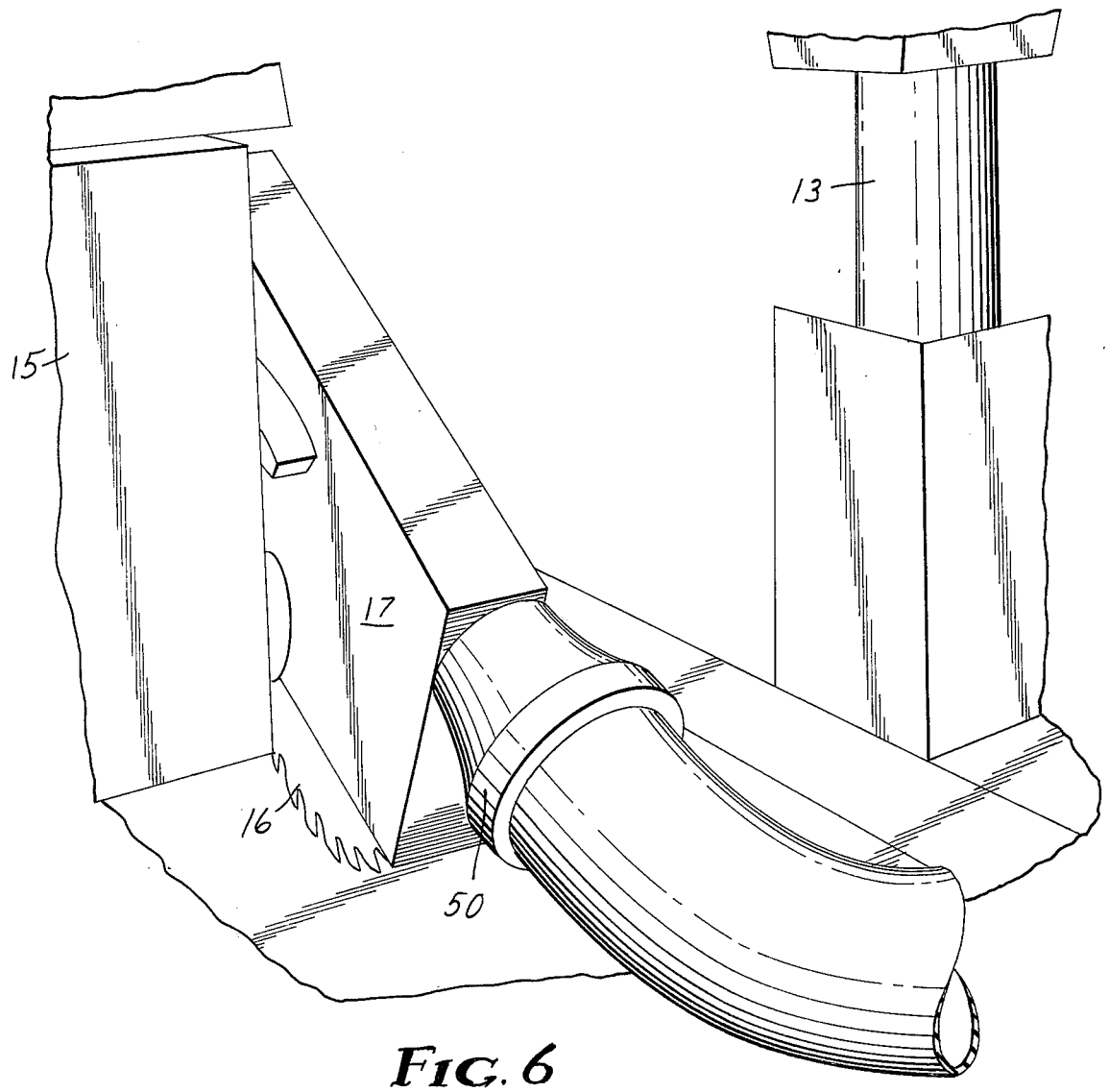
FIG. 6 is a perspective view of the saw in ripping position, showing a novel means for collecting dust.

An alternate form of clamp is shown in FIG. 4, where clamp 40 comprises vertically extending leg member 41, which is adapted to be firmly gripped between the back edge of rear table 11b and the front edge of spacer board 11c. Extending rearwardly from the upper edge of vertical member 41 is horizontal member 42, which has a relatively smooth and planar upper surface with a slightly upturned distal edge. Portion 43 of horizontal member 42, immediately adjacent the juncture with vertical member 41, is somewhat thicker than the remaining portion 44 of horizontal portion 42, the difference in thickness being slightly less than the thickness of hood floor 24. This arrangement permits clamp 40 to remain permanently in position, the leading edge of floor 24 being wedged beneath portion 44 and butted against the edge formed by thickened portion 43. The friction fit is sufficiently great to hold hood 20 in whatever position is desired, and, in addition to being slid to the right or left it may be pivoted either clockwise or counterclockwise to align outlet 22 with the direction in which blade 16 is driven.

Located in portion 43 of horizontal member 42 are countersunk screw holes 45, through which wood screws may be inserted to fasten clamp 40 to spacer board 11c. If this means of attaching clamp 40 is employed, vertical member 41 may, if desired be eliminated, greatly simplifying the clamp construction but making it necessary to employ tools in mounting it.

Figure 5:
FIG. 5 is a perspective view of still another clamp suitable for use in connection with my invention.
Figure 2:
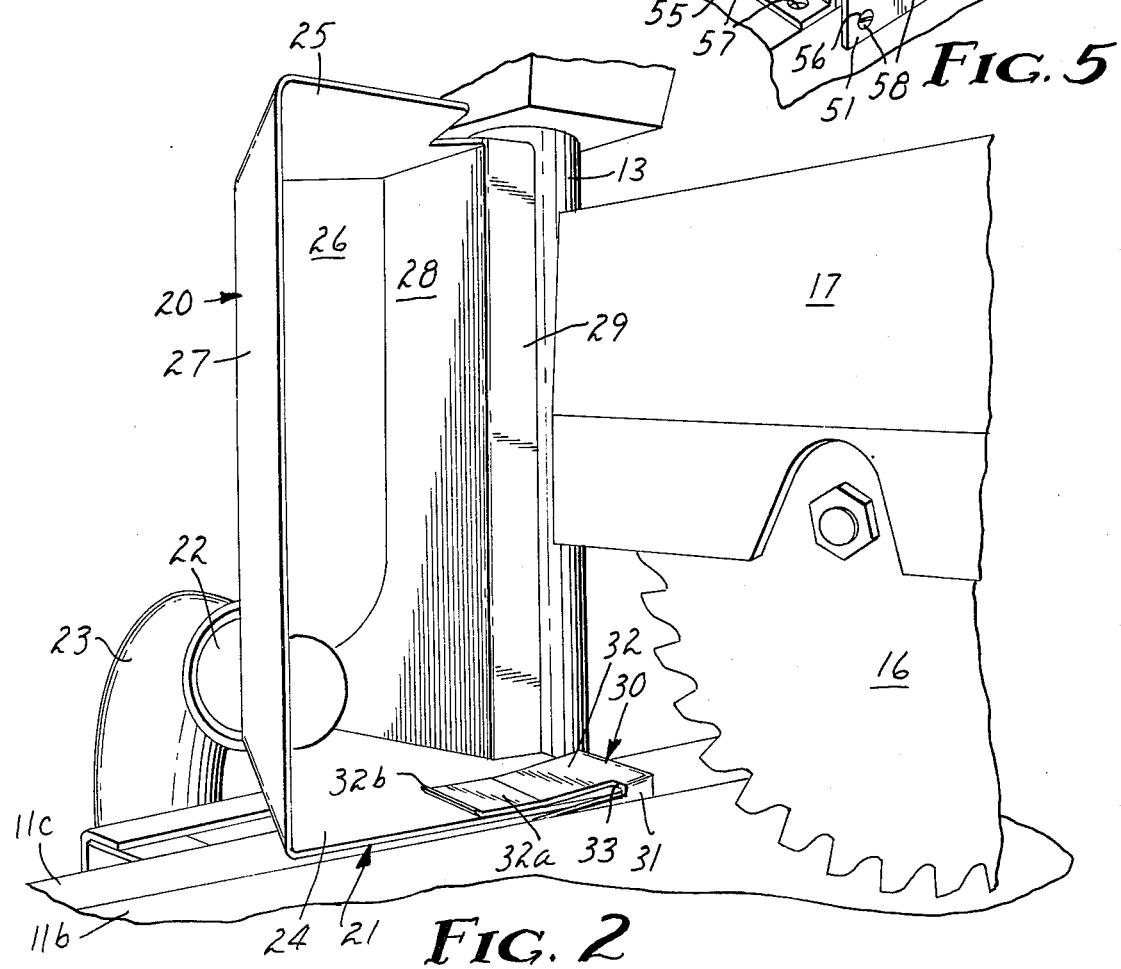
FIG. 2 is a perspective view of a portion of the device shown in FIG. 1, pointing out the manner in which the clamp holds the dust collector hood in position.
Figure 3:
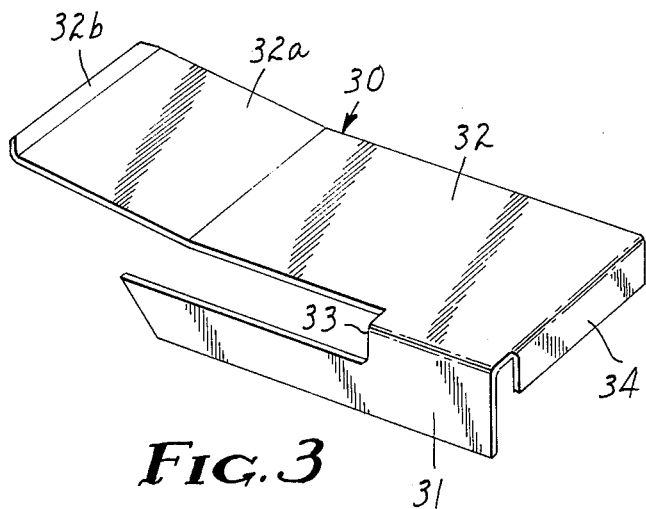
FIG. 3 is a perspective view of the presently preferred hood-holding clamp used in connection with the invention.

FIG. 5 shows clamp 50, which provides another means for gripping floor 24 of hood 20. To some extent, clamp 50 resembles a mirror image of clamp 30, comprising vertical member 51 and horizontal member 52, joined along corner 53. At one end of horizontal member 52 is downwardly turned edge 54, the lower edge of which is bent outward to form tab 55. The opposite end portion of horizontal member 52 is bent upward at a slight angle to form hold-down portion 52a, the distal edge of which is bent still more sharply upward to form lip 52b.

To aid in mounting clamp 50 vertical member 51 is provided with holes 56, and tab 55 is provided with holes 57. Screws 58 inserted through holes 56 can be threaded into the back edge of spacer board 11c, while screws inserted through holes 57 can be threaded into the top of spacer board 11c. Either or both of these means of attaching clamp 50 to spacer board 11c may be employed; if only one such means of attachment is employed, of course, clamp 50 can be simplified by constructing it so that it has only vertical member 51 or only tab 55.

When a radial arm saw is employed in the ripping position, blade 16, as previously indicated, is oriented parallel to rip fence 12. Saw carriage 15 is then held in fixed position above table 11a, with blade 16 so adjusted that it cuts slightly below the upper surface of work table 11a. For all practical purposes, there is no good way to align hood 20 with the direction in which blade 16 is rotating, and ripping operations are hence notoriously dirty. This fact is exacerbated by the fact that the dust generated in ripping tends to follow the saw, to leave the blade at all angles, and to be extremely difficult to collect. In the past, it has been common to mount a discharge elbow in an outlet in the peripheral portion of saw guard 17, aiming it away from the operator. When a dust collector was employed, the discharge elbow might either be directed toward hood 20 or connected to a flexible hose leading from guard 15 to the opening of hood 20, thereby channeling dust which passed through the outlet toward the desired collection site. While such arrangements represent a slight improvement over making no attempt to collect the sawdust, they have still been eminently unsatisfactory in ripping operations. I have now devised the simple expedient of normally capping the saw guard outlet but, during ripping operations, connecting vacuum hose 23 directly thereto, employing reducer 50 if necessary. I am thereby able to collect substantially all dust, wood fibers, chips, etc. during ripping operations. Elementary as this approach may seem in retrospect, to the best of my knowledge and belief no manufacturer or user of radial arm saws has previously appreciated the significant advantages which flow from this simple modification.

Reducer 50 is desirably constructed from a tough, but flexible and conformable rubber or synthetic polymeric material, permitting it to conform to circular or noncircular saw guard outlets of varying dimensions. If the change in size between the two ends of reducer 50 is effected via a conoidal or hyperboloidal transition, reducer 50 may also be used for other purposes. For example, the large end can be connected to outlet 22 of hood 20, permitting the attachment of a conventional home vacuum cleaner to the small end for dust collection in normal operations.

While several illustrative embodiments of the invention have been shown and described, it will be readily appreciated that it is impractical to set forth every possible type which is functional and that numerous variations can be made without departing from the spirit of the invention. Accordingly the scope of the invention is limited only by the appended claims.

What I claim is:

1. In combination with a radial arm saw assembly comprising a horizontal work table which includes a front table, a rear table and a spacer board, a vertical column at the rear of said table, a horizontally adjustable arm rotatably attached to the upper end of said column so as to be positioned over said table, a rotary saw protected by a saw guard carried by said arm, a dust collector positioned at the rear of said table, said collector comprising a generally flat-bottomed funnel-shaped hood having a wide inlet which opens towards the front of said table, said inlet being positioned entirely above the plane of said table, said hood being arcuately movable, the improvement which comprises said dust collector so positioned that the lower surface of the hood floor is in close contact with the upper surface of the spacer board, a clamp comprising a horizontal member, means holding said horizontal member in predetermined position above the upper surface of the spacer board, the lower surface of the hood floor contacting the spacer board and the lower surface of said horizontal member snugly engaging the upper surface of the hood floor so as to hold the hood firmly in a desired position.

2. The combination of claim 1 wherein the clamp comprises a vertical member connected to the horizontal member and extending downwardly therefrom, said vertical member being held firmly in contact with an edge of the spacer board.

3. The combination of claim 2 wherein the vertical member is firmly gripped between the back surface of the rear table and the front surface of the spacer board.

4. The invention of claim 1 wherein the dust collector hood comprises a left side and a right side, said right side being shorter front-to-back than said left side.

5. The invention of claim 2 wherein a lip extends to the right from the front edge of the left wall.

6. The invention of claim 3 wherein the vertical member and the horizontal member are joined along an isthmus, said horizontal member having a downturned edge at one end and the portion of said horizontal member adjacent its opposite end being turned up slightly to provide a hold-down portion.

7. The invention of claim 6 wherein a distal edge portion of the hold-down portion is sharply upturned to form a lip facilitating insertion of the hood floor therebeneath.

8. The invention of claim 3 wherein the upper surface of the horizontal member of said clamp is substantially planar and the lower face of said horizontal leg member has a thickened portion immediately adjoining its juncture with the vertical member, said thickened portion exceeding the thickness of the remainder of said horizontal leg member, by slightly less than the thickness of the hood floor, whereby said clamp may be left permanently in position and said dust collector may be removed or repositioned as desired.

* * * * *